Aug. 21, 1923.
B. SIMPSON
1,465,875
TAILOR'S MEASURE
Filed Aug. 22, 1921
2 Sheets-Sheet 1
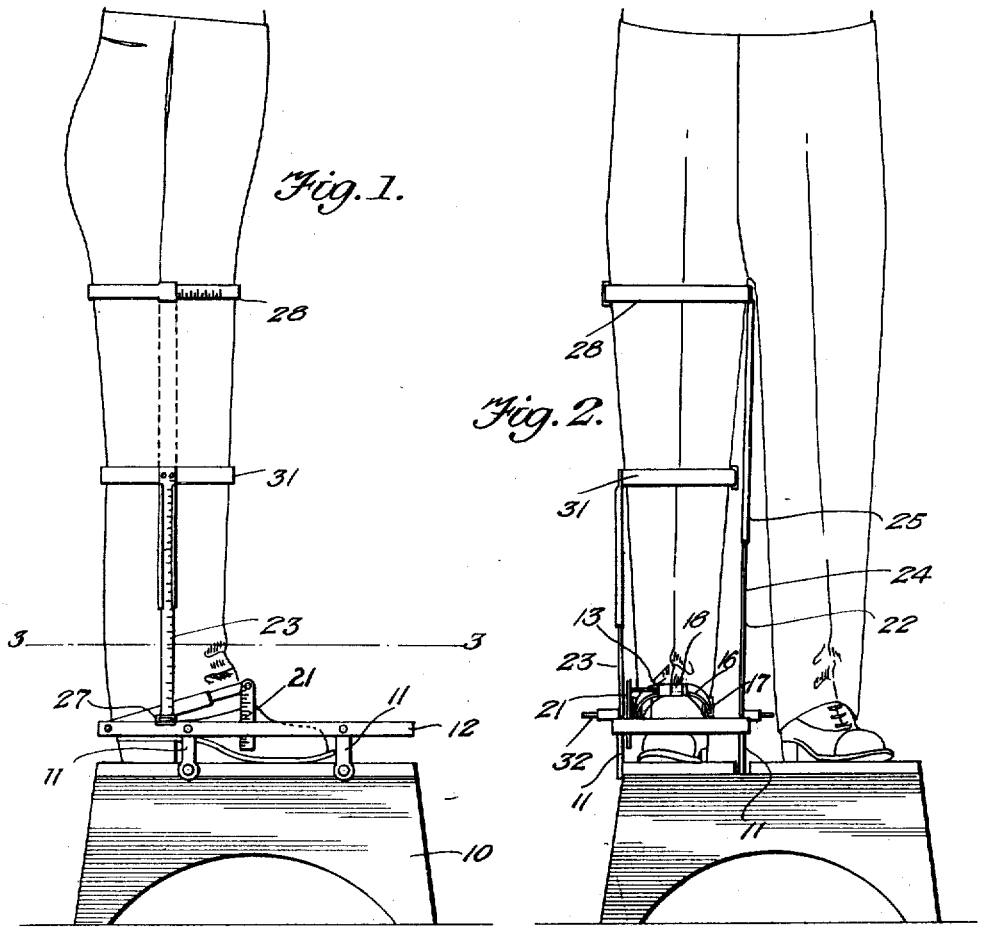
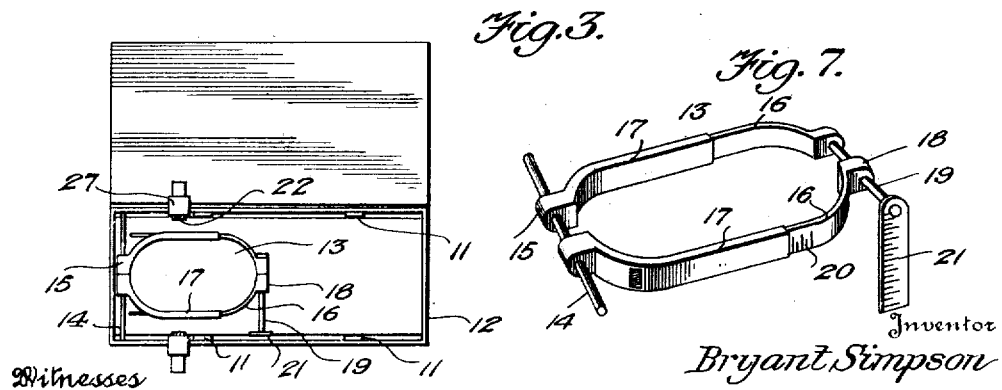
Witnesses
Geo. Ackman Jr.
Inventor
Bryant Simpson
By Victor J. Evans
Attorney Aug. 21, 1923.                                    1,465,875
B. SIMPSON
TAILOR'S MEASURE
Filed Aug. 22, 1921        2 Sheets-Sheet 2

Witnesses
Geo. Ackman Jr.

Inventor
Bryant Simpson
By Victor J. Evans
Attorney

Patented Aug. 21, 1923.

1,465,875

UNITED STATES PATENT OFFICE.

BRYANT SIMPSON, OF WASHINGTON, DISTRICT OF COLUMBIA.

TAILOR'S MEASURE.

Application filed August 22, 1921. Serial No. 494,230.

*To all whom it may concern:*

Be it known that I, BRYANT SIMPSON, a citizen of the United States, residing at Washington, in the District of Columbia, have invented new and useful Improvements in Tailors' Measures, of which the following is a specification.

This invention relates to improvements in tailors' measures and is especially designed for measuring pantaloons or trousers.

An object of the invention is the provision of a device of this character which may be easily and quickly adjusted to the leg of a person to accurately indicate the various measurements necessary for making a pair of trousers, these measurements including the "hollow" at the bottom of the trousers over the instep.

With the above and other objects in view, the invention further includes the following novel features and details of construction, to be hereinafter more fully described, illustrated in the accompanying drawings and pointed out in the appended claims.

In the drawings:—

Figure 1 is a side elevation illustrating the use of the invention.

Figure 2 is a front view thereof.

Figure 3 is a plan view of the measuring device per se, with the combined supporting and measuring arms shown in section.

Figure 7 is a detail perspective view of the adjustable bottom measure.

Figure 6:
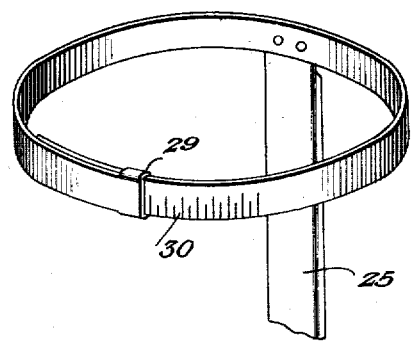
Figure 6 is a perspective view of one of the adjustable measuring bands for the leg, showing its connection with the supporting and measuring arm.

Referring in detail to the drawings, wherein like characters of reference denote corresponding parts, the measuring device which constitutes the present invention is mounted upon a suitable base or support, which in the present instance is shown as a stool of the type usually used by tailors when taking measurements, this stool being indicated at 10. Secured to and spaced from the top of the stool through the medium of pivotally connected links 11 is a frame 12 which is herein shown as of rectangular shape. The frame is thus adjustable with respect to the top of the stool and is therefore capable of being adjusted to the lower extremity of the leg of a pair of trousers.

Pivotally mounted within the frame 12 is a telescopically adjustable measure 13 which is designed for the purpose of measuring the bottom of the trouser leg. This frame is mounted for pivotal movement on a bar 14 which passes through ears 15 located at the rear end of the frame, the latter being formed of separate members which are laterally movable upon this bar. Each of these members includes a section 16 and a section 17, the former telescoping within the latter and being provided with an apertured ear 18 for the passage of a rod 19. This rod forms a guide at the outer end of each of the members of the bottom measure 13 so as to permit of its being readily adjusted around a shoe for the purpose of measuring the bottom of the trouser leg. The section 16 of each of the members is provided with suitable graduations shown at 20 to indicate the size of the bottom of the leg. Pivotally mounted upon one end of the rod 19 is a gauge 21, which is also graduated and which cooperates with one side of the frame 12. This gauge will indicate the measurement from the instep of the shoe so as to provide the front part of the trouser bottom with the proper "hollow" and proper inclination from the front to the back of the said bottom.

In the use of the invention as so far described, the measure 13 is adjusted around the shoe as shown in Figure 1 at the lowest point of the bottom of the trouser leg. The front of the measuring frame 13 is positioned over the instep, whereupon the proper size of the bottom of the trouser leg may be read on the graduations 20, while the "hollow" or slope from the front to rear of the leg may be read on the graduations of the gauge 21.

Figure 5:
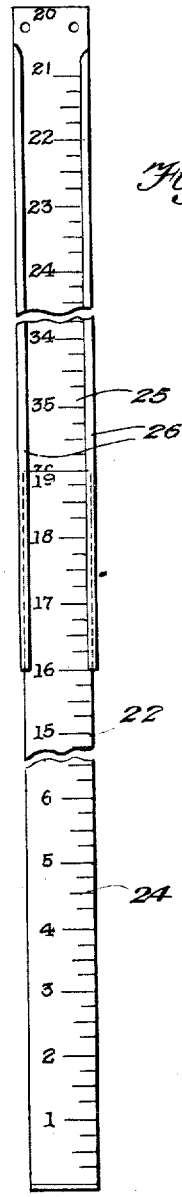
Figure 5 is a similar view of the inner supporting and measuring arm.

Extending upward from each side of the leg is a combined support and measuring arm, the inner arm being indicated at 22, while the outer arm is indicated at 23. The inner arm is designed for the purpose of measuring the inseam of the trousers and for this purpose is capable of adjustment. It includes a section 24 and a section 25, the former telescoping or sliding within the latter. The section 25 is formed with inturned flanges 26 to provide a groove for the reception of the section 24 and each of the said sections are provided with graduated indicia which may be read to indicate the length of the seam. The indicia is preferably arranged as shown in Figure 5 wherein the highest number visible will indicate the length of the seam.

Figure 4:
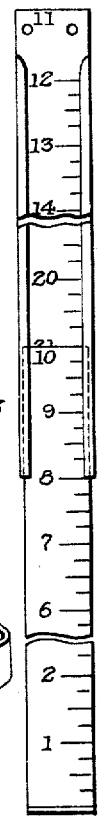
Figure 4 is an elevation of the outer supporting and measuring arm.
Figure 8:
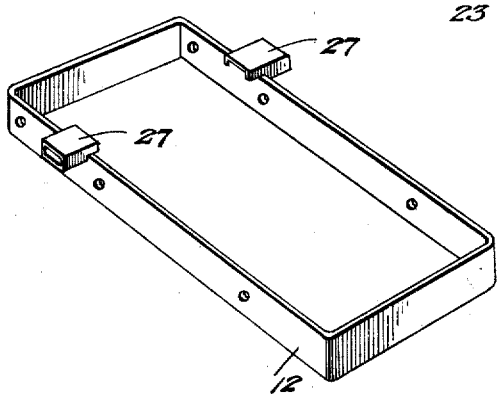
Figure 8 is a similar view of the pivoted supporting frame.

The arm 23 which is positioned upon the outside of the trouser leg is similarly formed as shown in Figure 4 so that it is not believed necessary to repeat the detailed description. The lower sections of each of the arms 22 and 23 are removably received within sleeves 27 located upon opposite sides of the frame 12, while the upper end of the arm 24 is provided with a measuring band 28 which is adapted to surround the thigh. This band 28 has one end adjustably telescoped to a loop 29 carried at the other end and is provided with graduations 30 so that the measurement of the thigh may be easily read. The arm 23 has secured to its upper end a measuring band 31 of similar formation which is designed to indicate the measurement at the knee. It will thus be seen that the arms 22 and 23 provide combined supporting and measuring arms and have their lower ends formed with right angular extensions 32 which are receivable within the sleeves 27 previously mentioned.

The invention is susceptible of various changes in its form, proportions and minor details of construction and the right is herein reserved to make such changes as properly fall within the scope of the appended claims.

Having described the invention what is claimed is:—

1. A tailors' measure comprising a support, an adjustable shoe encircling measure pivotally secured thereto for measuring the bottom of a trouser leg and a gauge pivotally secured to the adjustable measure for measuring the angle of the bottom of a trouser leg.

2. A tailors' measure comprising a base, a frame, means whereby the frame is movably connected to and spaced from the base, an adjustable shoe encircling measure, means for pivotally securing the rear end of said measure to the rear of the frame and a gauge pivotally secured to the forward end of the measure and co-operating with the frame.

3. A tailors' measure comprising a base, a frame, means whereby the frame is movably connected to and spaced from the base, a combined supporting and measuring arm carried by each side of the frame and an adjustable measuring band carried by each arm.

4. A tailors' measure comprising a base, a frame, means whereby the frame is movably connected to and spaced from the base, a combined supporting measuring arm carried by each side of the frame and a telescopically adjustable measuring band carried by each arm.

5. A tailors' measure comprising a base, a frame, means whereby the frame is movably connected to and spaced from the base, a telescopically adjustable combined supporting and measuring arm carried by each side of the frame and an adjustable measuring band carried by each arm.

6. A measuring device for trousers comprising a support, a frame, means whereby the frame is movably connected to and spaced from the support, a shoe encircling band pivotally secured to the support, a measuring arm supported upon each side of the frame and a measuring band carried by each arm.

7. A tailors' measure comprising a support, a longitudinally and laterally expansible shoe encircling measure carried by the support for measuring the bottom of a trouser leg and a gauge pivotally secured to the adjustable measure for measuring the angle of the bottom of a trouser leg.

In testimony whereof I affix my signature.

BRYANT SIMPSON.